(12) United States Patent
Elazouni

(10) Patent No.: US 7,644,007 B2
(45) Date of Patent: Jan. 5, 2010

(54) METHOD AND APPARATUS FOR FINANCE-BASED SCHEDULING OF CONSTRUCTION PROJECTS

(75) Inventor: Ashraf Elazouni, Zagazig (EG)

(73) Assignee: King Fahd University of Petroleum & Minerals, Dhahran (SA)

( * ) Notice: Subject to any disclaimer, the term of this patent is extended or adjusted under 35 U.S.C. 154(b) by 1362 days.

(21) Appl. No.: 10/176,882

(22) Filed: Jun. 17, 2002

(65) Prior Publication Data

US 2003/0233303 A1 Dec. 18, 2003

(51) Int. Cl.
G06Q 40/00 (2006.01)
G06F 17/60 (2006.01)
(52) U.S. Cl. .......................... 705/8; 705/35; 705/36 R; 705/38; 705/40
(58) Field of Classification Search .................. None
See application file for complete search history.

(56) References Cited

U.S. PATENT DOCUMENTS

| | | | |
|---|---|---|---|
| 6,859,768 B1 * | 2/2005 | Wakelam et al. ................ | 703/1 |
| 2003/0018507 A1 * | 1/2003 | Flanagan ........................ | 705/8 |
| 2004/0205519 A1 * | 10/2004 | Chapel et al. ................ | 715/502 |

FOREIGN PATENT DOCUMENTS

JP 2002-024326 A * 1/2002

OTHER PUBLICATIONS

Padman and Smith-Daniels. Heuristic Scheduling of Resource-Constriained Projects with Cash Flows. Naval Research Logistics, 1997, vol. 44, pp. 365-381.*

Russell, Robert A. A Comparison of Heuristics for Scheduling Projects with Cash Flows and Resource Restrictions. The Institute of Management Sciences, Oct. 1986, vol. 32, No. 10, pp. 1291-1300.*

Kazaz, Burak and Sepil, Canan. Project Scheduling with Discounted Cash Flows and Progress Payments. Journal of Operaitonal Research, 1996, vol. 47, pp. 1262-1272.*

Smith-Daniels D. & V. Maximizing the Net Present Value of a Project Subject to Materials and Capital Constraints. Journal of Operaions Management, Oct. 1987, vol. 7, No. 2, pp. 33-45 (abstract only).*

(Continued)

Primary Examiner—Albert DeCady
Assistant Examiner—Dave Robertson
(74) Attorney, Agent, or Firm—Richard C. Litman

(57) ABSTRACT a method and apparatus is disclosed for scheduling construction projects based on the available finance using integer programming. This method renders CPM/PERT schedules of construction projects executable using bank overdrafts of specified credit limits. Conveniently, the method is organized in three stages; input preparation, schedule extension, and model formulation. Input preparation stage supports preparing CPM/PERT schedule and financial data of the project. Schedule extension stage supports developing a scheme for schedule extension. The scheme is a framework of the original schedule that allows a definite extension increment in the critical path of the CPM. Model formulation stage supports building an integer programming model for the scheme and involves the components of formulating an objective function, setting constraints, and searching for a model solution. The model solution determines the activities' shifts that fulfill the constraints of the specified credit limit while minimizing the schedule extension. A search for a solution of the model is performed. If no solution is found, a repetition of the last two stages of the method is performed after allowing longer extension increment.

9 Claims, 7 Drawing Sheets

OTHER PUBLICATIONS

Figure 1:
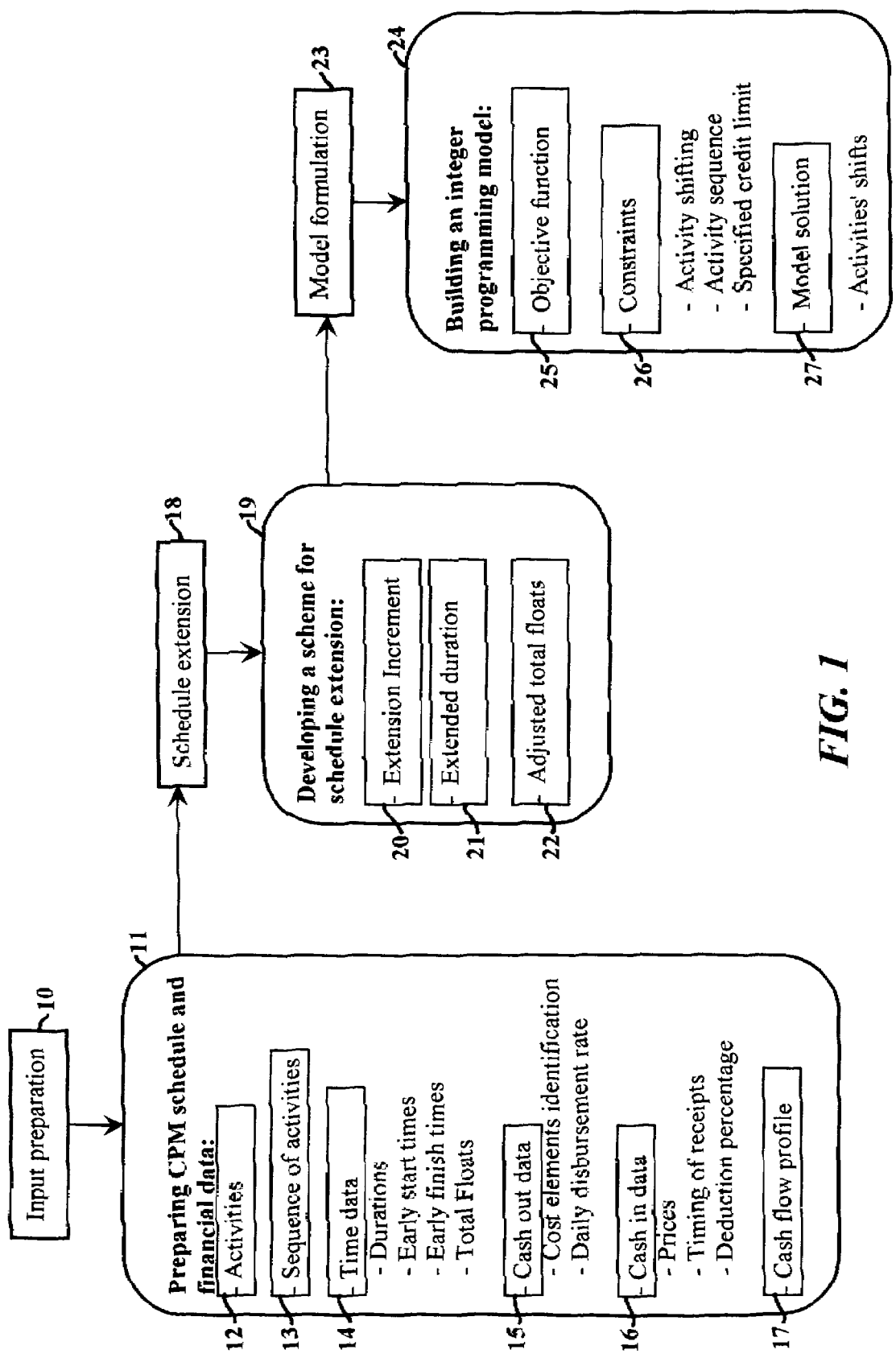

Sears, Glenn "CPM/COST: An Integrated Approach" in Journal of the Construction Division, Proceedings of the American Society of Civil Engineers, v7, n1, 1981, pp. 227-238.*

Karshenas, Saeed and Haber, David "Economic Optimization of Construction Project Scheduling" in Construction Management and Economics, 1990, v8, 135-146.*

Barbosa, Paulo S. F. and Pimentel, Priscilla R. "A Linear Programming Model for Cash Flow Management in the Brazlian Construction Industry" in Construction Management and Economics, 2001, v19, pp. 469-479.*

Navon, R. "Resource-based Model for Automatic Cash-flow Forecasting" in Construction Management and Economics, 1995, v13, pp. 501-510.*

Tung AU, and Chris Hendrickson "Profit Measures for Construction Projects" Journal of Construction Engineering and Management, vol. 112, No. 2, Jun. 1986 pp. 273-286.

Said M. Easa "Resource Leveling in Construction by Optimization" Journal of Construction Engineering and Management, vol. 115, No. 2, Jun. 1989, pp. 302-315.

* cited by examiner

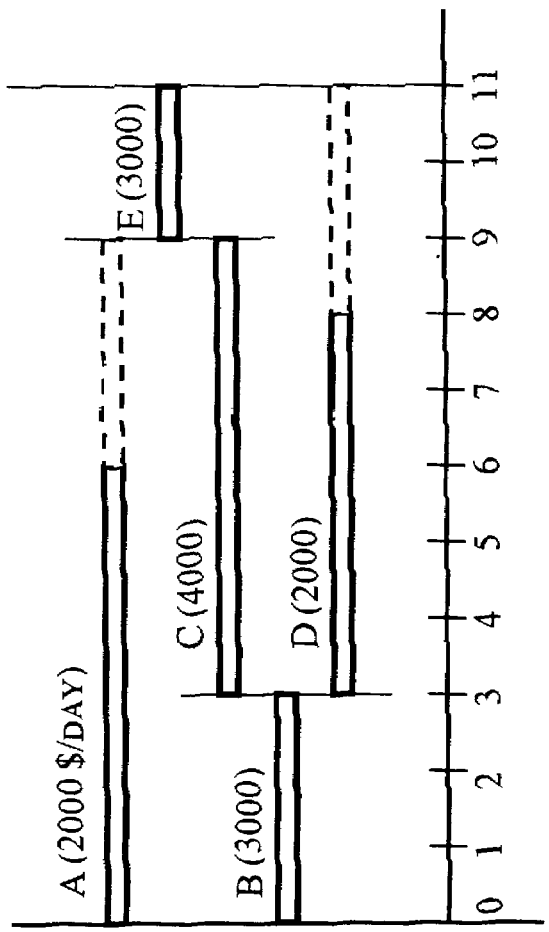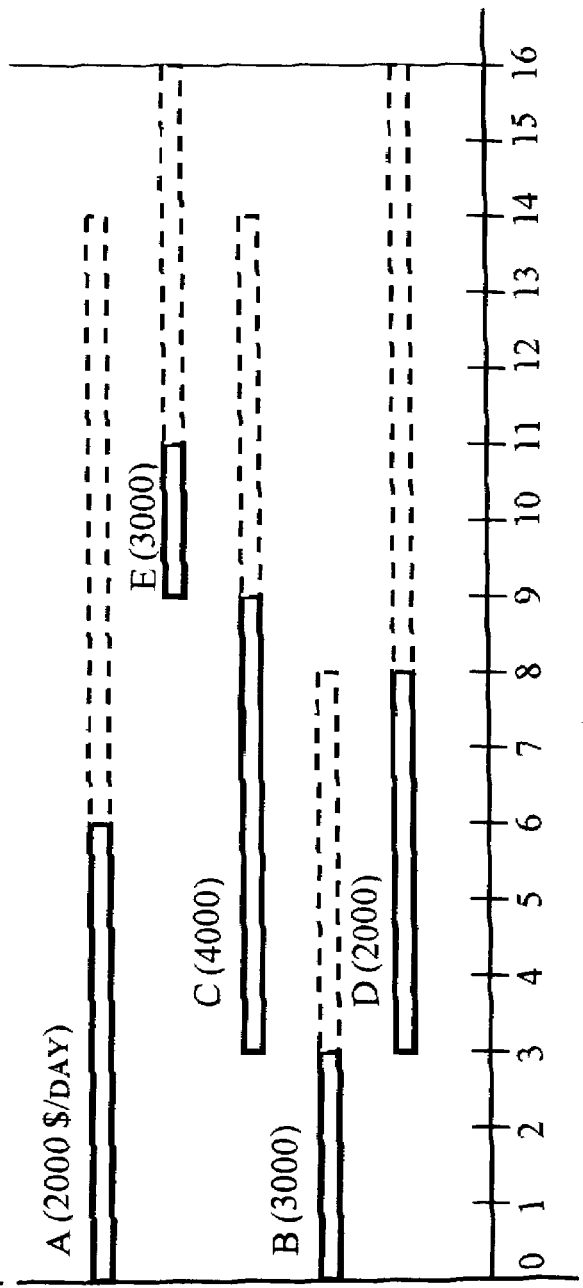
FIG. 7A
FIG. 7B

METHOD AND APPARATUS FOR FINANCE-BASED SCHEDULING OF CONSTRUCTION PROJECTS

BACKGROUND

1. Field of Invention

This invention relates to scheduling systems, specifically to such systems which are used for scheduling construction projects.

2. Description of the Prior Art

A crucial factor for construction contractors to run profitable business represents the ability to timely procure adequate fund to execute construction activities with minimum financing cost. During any period of a project, contractors will never carry out any activity the available finance can not afford despite the obligation to adhere to the project schedule. This explicit principle of operation makes the establishment of a balance, along project duration, between activities' disbursement and available finance a very vital concept to produce a realistic schedule of project activities.

The establishment of bank overdrafts has been one of the prevalent methods of financing construction projects. Practically, contractors establish a bank overdraft with a specified credit limit to finance a new project. Then, they proceed with the execution of project activities such that the disbursements during any period, week or month, will never cause negative cash flow to exceed the credit limit of the established overdraft. An additional component of financing during a period represents a receipt collected as a reimbursement for work performed during a previous period of the project. Contractors usually deposit these components in the overdraft account to avoid that the negative cash flow reaches the credit limit and also to reduce the financing cost. Accordingly, contractors are always interested in developing schedules that make project negative cash flow never exceeds the specified credit limit. Since this concept of scheduling is based on finance availability, it can be referred to as finance-based scheduling.

There are many techniques that were developed in the literature to schedule construction projects based on different concepts. CPM/PERT scheduling techniques were developed with an underlying concept of minimizing the project duration. Subsequently, many algorithms have been developed to enhance their usefulness. Among these algorithms, resource management techniques offer a substantial enhancement. The literature involves many heuristic, optimal and sub-optimal methods that have been developed to modify CPM/PERT schedules in account of practical considerations of project resources. Despite the fact that money is a major construction resource, none of the resource management techniques considered the modification of CPM/PERT schedules to balance the project expenditures with the available finance along the project duration.

Generally, traditional resource management models with the available finance treated as a constrained resource can not be considered as a substitute for the proposed finance-based scheduling method. This is due to the fact that part of the finance available during a given period is generated as a reimbursement for a work that was performed during a previous period of the same project. Thus, a complete profile of finance available along the project duration, which is a required input to these models, can not be readily established.

On the other hand, resource-oriented scheduling techniques including line of balance (LOB) and linear scheduling method (LSM) are underlied by the concept of efficient use of resources. Operating under this concept necessitates the practice of some sort of central control over resources. As a matter of fact, central control over resources might exist in the military or job shop scheduling in a factory, but does not exist in construction projects. Instead, contractors and subcontractors allocate resources mainly based on the availability of finance. They determine the pace of work considering the efficient use of resources provided that finance availability constraint is fulfilled.

As outlined before, although many techniques were developed to schedule construction projects, these techniques suffer from a number of disadvantages:

1—None of the present scheduling techniques includes in its underlying concept or algorithm any consideration for the establishment of a balance between the disbursement of the scheduled activities and the available finance during a given period. Consequently, the available scheduling techniques are possibly to produce financially nonrealistic schedules.

2—None of the present scheduling techniques shows how to develop schedules that correspond to overdrafts of desired credit limits. Lack of control on overdraft credit limits hinders contractors to negotiate good deals in obtaining bank overdrafts.

3—None of the present scheduling techniques relates the schedules of all existing and planned projects, In case of a contractor implementing many projects simultaneously, to the overall liquidity situation of the contractor.

4—None of the present scheduling techniques can help owners ask for a schedule that produces a desired progress payment requirements scheme that serves his financial interests.

Objects and Advantages:

Accordingly, several objects and advantages of my finance-based project scheduling system are:

1—Establishes financial feasibility in the scheduling process by simultaneously relating the disbursements of scheduled activities during periods to the finance available in the corresponding periods. In other words cause the negative cash flow always undervalues the specified credit limit.

2—Enables developing schedules that correspond to overdrafts of desired credit limits. The control on overdraft credit limit provides many benefits including:

Negotiating lower interest rates with banks,

Setting favorable terms of repayment,

Reducing penalties incurred for any unused portion of an overdraft.

Avoiding the phenomenon of spiraling down. This situation occurs when the finance available in a given period does not allow scheduling much work. During the next period at which a reimbursement is expected, the generated income will allow scheduling less work, and so forth.

3—Relates schedules of all existing and planned projects, In case of a contractor implementing many projects simultaneously, to overall liquidity situation of the contractor. This brings about many benefits including:

insures that projects with large negative cash flows do not compound each other. Upon contrast, when surplus cash is available, the method utilizes this cash in scheduling additional work.

Helps contractors make key decisions regarding bidding for new projects, determining construction rates, and specifying optimum commencement dates of new projects.

4—Helps owners adjust the profile of financial commitments to contractors to suit their capabilities. When bids are awarded, owners can ask contractors to estimate the progress payment requirements along the project duration. Then, owners can ask for a schedule that produces a desired progress payment requirements scheme that serves financial interests.

Further objects and advantages are to provide an optimization technique, integer programming, which provides optimum solution as a schedule that fulfills financing constraint of the specified credit limits and still minimizes the project duration. Still further objects and advantages will become apparent from a consideration of the drawings and ensuing description.

DRAWING FIGURES

FIG. 1 The stages of the scheduling method.

Figure 2:
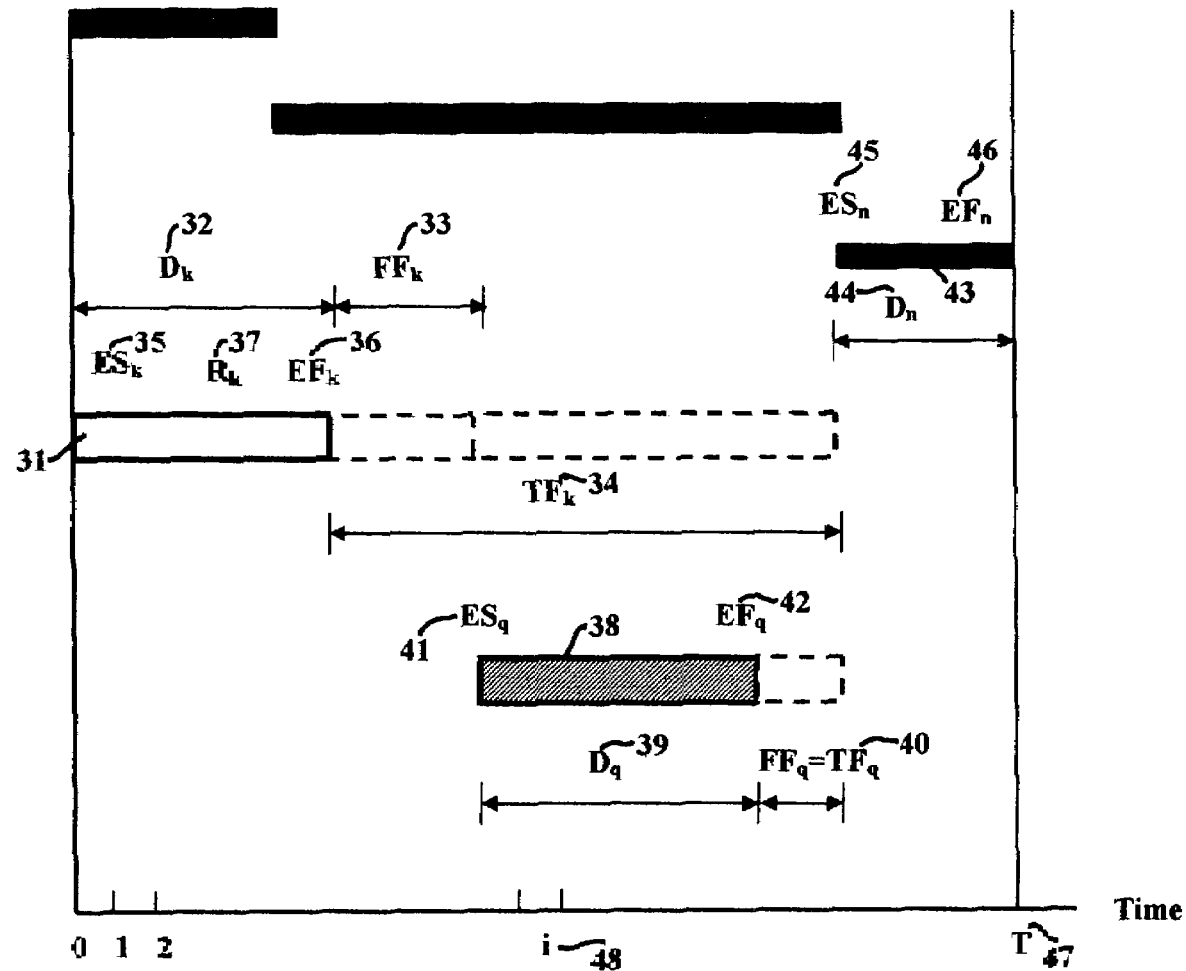

FIG. 2 A schematic diagram of a typical activity k in a CPM network.

Figure 3:
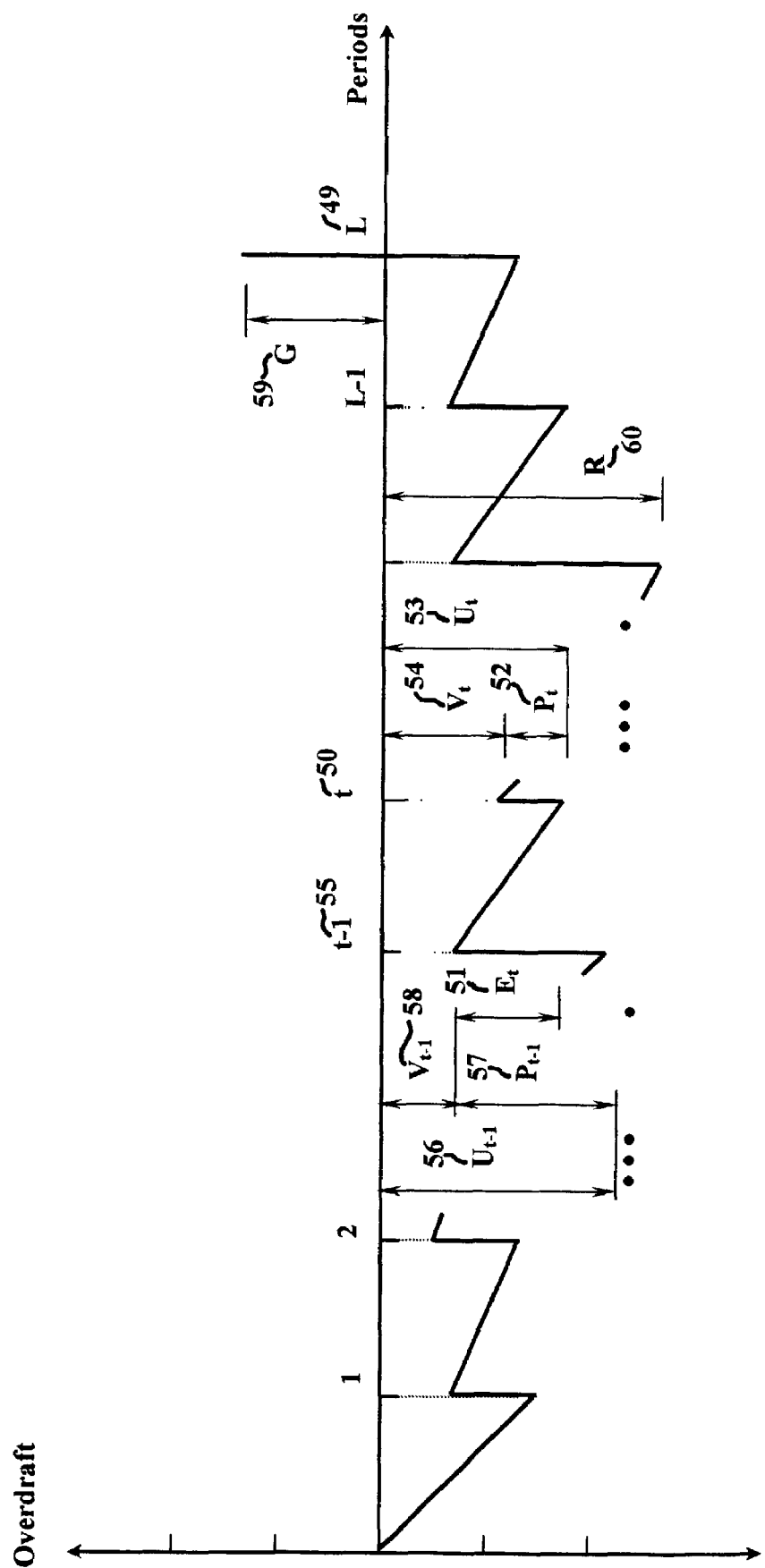

FIG. 3 A typical cash flow profile for a construction project.

Figure 4:
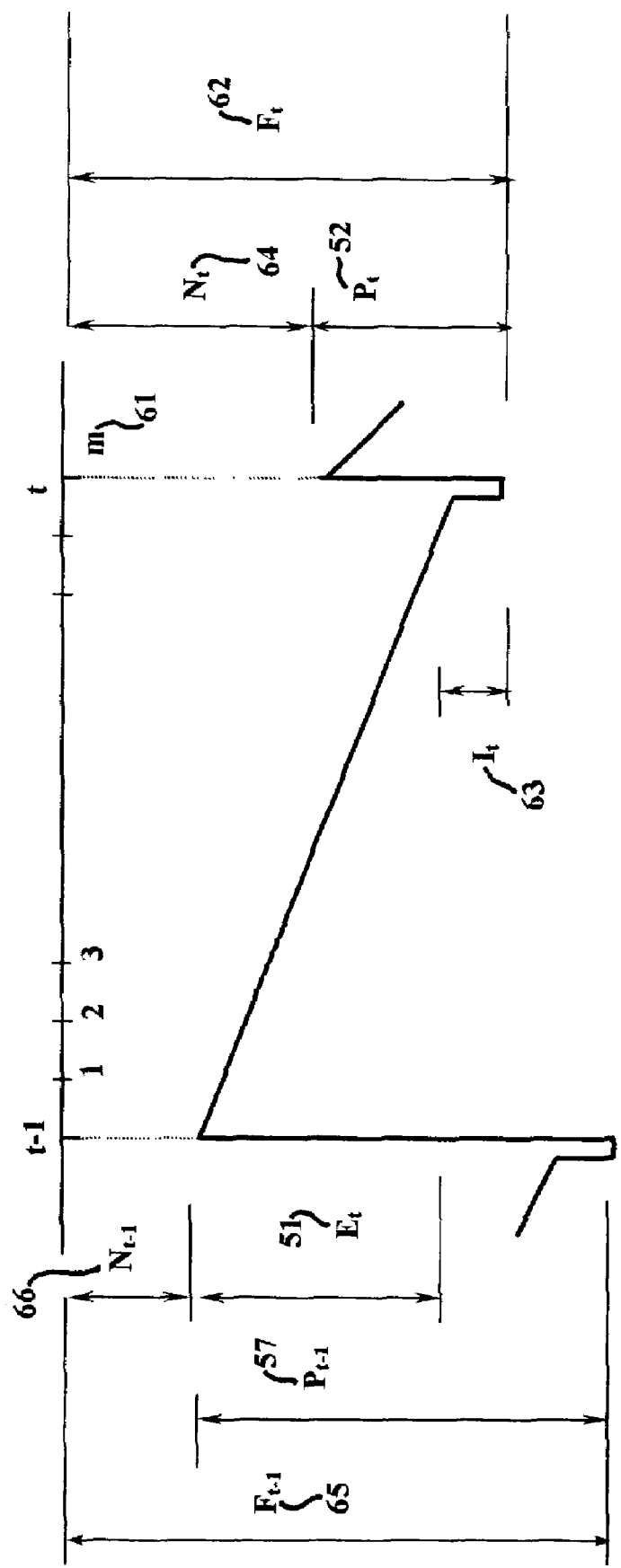

FIG. 4 The financial terms of a period t.

Figure 5:
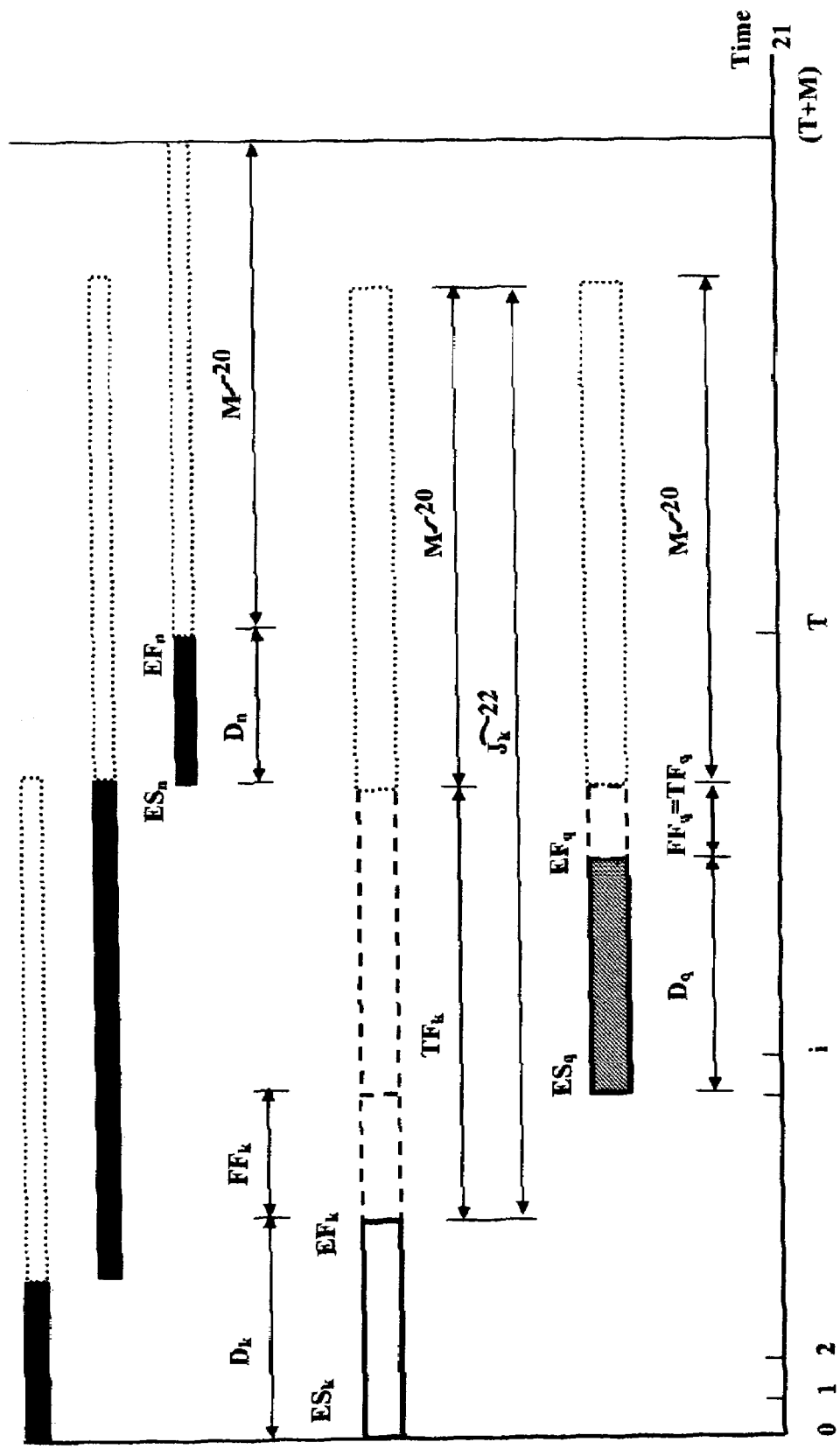

FIG. 5 The CPM network with extension increment M, and extended duration.

Figure 6:
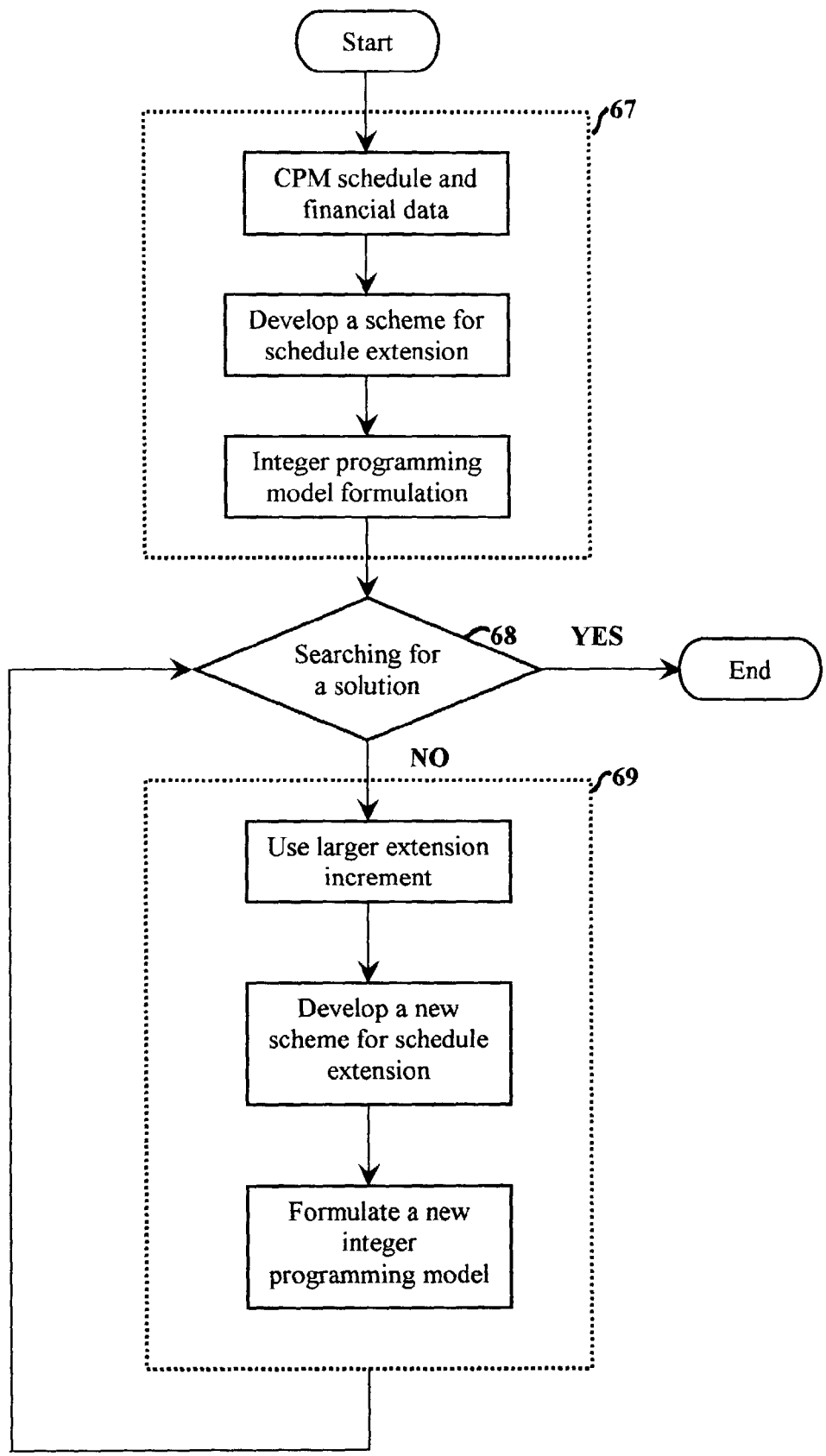

FIG. 6 The logic involved in the scheduling method.

FIGS. 7A, and 7B are an example CPM schedule and its scheme.

DESCRIPTION OF THE PREFERRED EMBODIMENT

FIG. 1 illustrates the use of the method to produce finance-based schedules for construction projects. Even though this is the preferred embodiment, there is nothing about the invention that precludes it from being implemented in various manifestations other than the one described here.

In order to support the invention function, the method is comprised of three primary stages as shown in FIG. 1.

Input Preparation

The input preparation stage (as seen in stage 10 of FIG. 1) supports preparing CPM/PERT schedule and financial data of the project generally designated by 11 which involves activities 12, sequences of activities 13, time data 14, cash out data 15, cash in data 16, and a cash flow profile 17. Time data involves durations, early start times, early finish times, and total floats of activities. Cash out data involves identification of cost elements and determination of daily disbursement rates of activities. Cash in data involves prices, timing of receipts, and deduction percentage. The cash flow profile plots cash in and cash out transactions against time. The terminology of the previous schedule and financial data is described in detail in FIG. 2, FIG. 3, and FIG. 4.

FIG. 2 represents a schematic diagram of a typical activity k 31 in a CPM schedule. Activity k has a duration $D_k$ 32, a free float $FF_k$ 33, a total float $TF_k$ 34, an early start time $ES_k$ 35, an early finish time $EF_k$ 36, and a disbursement rate $R_k$ 37 which includes direct costs of material, labor, equipment, and subcontractors, and indirect costs of overheads, bonds, and taxes; k=1,2, . . . , n where n is the number of project activities (not shown in FIG. 2). An activity q 38, designated by a hatched bar in FIG. 2, is a representative activity of the set of activities $Q_k$ (not shown in FIG. 2) that depend on the early finish time of activity k. Activity q has a duration $D_q$ 39, a free float $FF_q$ which is the same as total float $TF_q$ and designated by 40, an early start time $ES_q$ 41, and an early finish time $EF_q$ 42. An activity n 43, designated by a solid bar in FIG. 2, is a representative activity of project critical activities, at the same time it is the terminating activity in the CPM schedule. Activity n has a duration $D_n$ 44, an early start time $ES_n$ 45, and an early finish time $EF_n$ 46. A duration T 47 of CPM schedule is the total number of working days, and i 48 denotes to a typical working day of the schedule.

Let total disbursements of all activities performed in day i be denoted by $y_i$; this will be referred to as project disbursements at day i. Thus;

$$y_i = \sum_{p=1}^{n_i} y_{pi} \qquad \text{Eqn (1)}$$

Where; $n_i$ is the number of activities that have their durations and float values overlapping with day i; and $y_{pi}$ is the disbursement rate of activities in terms of their R values as is formulated in Equations 16 below.

A cash flow profile 17 is shown in FIG. 3 for a construction project of L 49 periods. The cash flow profile is from the contractors' perspective. The equations are presented conforming to the financial terminology used by Au, T. and Hendrickson, C., Profit Measures for Construction Projects, Journal of Construction Engineering and Management, Vol. 112, No. 2, pp. 273-286 (1986). A project disbursement during a typical project period t 50 is represented by $E_t$ 51, the timing of receiving a receipt from owner is at the end of the same period, and a receipt amount is represented by $P_t$ 52; where:

$$E_t = \sum_{i=1}^{m} y_i \qquad \text{Eqn (2)}$$

$$P = K.E_t \qquad \text{Eqn (3)}$$

Where, m is the number of days comprising period t, as will be indicated in FIG. 4, K is a multiplier to account for a deduction percentage owners cut of receipts. A cumulative cash flow at the end of period t (for t≧1) is $U_t$ 53, where;

$$U_t = V_{t-1} + E_t \qquad \text{Eqn (4)}$$

A net cash flow at end of period t after receiving receipt is $V_t$ 54. At the end of previous period (t−1) 55, FIG. 3 shows also a cumulative cash flow $U_{t-1}$ 56, a receipt at end of the period $P_{t-1}$ 57, and a net cash flow $V_{t-1}$ 58, where;

$$V_{t-1} = U_{t-1} + P_{t-1} \qquad \text{Eqn (5)}$$

FIG. 3 shows a net profit G 59 achieved at end of the project, and a maximum negative cash flow R 60 reached in this cash flow profile (not all negative cash flows are shown in FIG. 3). It is to be noted that, the above calculations are based on the premise that the contractor pays the interest charges due at end of each period, where the total interest charges $O_t$ at end of period t is;

$$O_t = rV_{t-1} + r\frac{E_t}{2} \qquad \text{Eqn (6)}$$

Where; r is the borrowing rate per period.

The first component of $O_t$ represents the interest per period on the net cash flow $V_{t-1}$; the second component approximates interest on $E_t$.

However, if the contractor pays the periodical interest on the accumulated cash flow at a borrowing rate r, FIG. 4 shows that a cumulative cash flow at the end of period t, which encompasses m 61 days, including accumulated interest charges is designated by $F_t$ 62 where, $$F_t = U_t + I_t \quad \text{Eqn (7)}$$

Where; $I_t$ 63 is an accumulated interest charges till the end of period t.

$$I_t = \sum_{l=1}^{t} O_l(1+r)^{t-l} \quad \text{Eqn (8)}$$

A net cash flow up till end of period t is $N_t$ 64 where;

$$N_t = F_t + P_t \quad \text{Eqn (9)}$$

For period t−1, a cumulative cash flow at the end of this period including accumulated interest charges is $F_{t-1}$ 65, and a net cash flow is $N_{t-1}$ 66.

Schedule Extension

Developing CPM schedules that are constrained with a specified credit limit involves extension rather than compression in these schedules. Practically, numerous extended schedules could be produced for a given schedule. Thus, a fundamental objective of the method is to minimize extension in schedules. A schedule extension stage 18 of the method (as seen in FIG. 1) supports developing a scheme for schedule extension generally designated by 19. The scheme (as illustrated in FIG. 5) is a structure of the original schedule that allows a definite extension increment M 20 in the critical path of the CPM schedule, adds the extension increment to original project duration to determine an extended duration (T+M) 21, and extends the total floats of activities by the extension increment to produce adjusted total floats $J_k$ 22. This can be expressed as:

$$J_k = M + TF_k \quad \text{Eqn (10)}$$

The adjusted total float is the time space within which an activity can be shifted without affecting the extended duration of the schedule. For instance, in FIG. 5, activity k can be shifted all the way to the end of its illustrated adjusted total float. Consequently, activity n should be shifted to the end of its adjusted total float to maintain the relation that activity n depends on activity k. Thus, the shift of activity k can be done without causing further extension beyond (T+M). The same scenario is valid between activities q and n.

The scheme represents a defined framework of definite boundaries where a solution can be searched. Thus, searching for a solution within a scheme transforms the boundless problem of extending schedules to fulfill finance constraints to a bounded and defined problem that can be modeled.

Model Formulation

The model formulation stage 23 (as seen in FIG. 1) supports building an integer programming model for the scheme generally designated by 24 and involves the components of formulating an objective function 25, setting constraints 26, and searching for a model solution 27. Constraints involve activity shifting, activity sequence, and specified credit limit. The model solution determines the activities' shifts that minimizes the total duration fulfilling the constraints of, activity shifting, and activity sequence and specified credit limit.

The logic of searching for a solution in the present invention is outlined in FIG. 6 which comprises an application of previously discussed three-stage model, generally designated by 67. A search 68 for a solution of the model is performed. If no solution is found, a repetition of the last two stages of the method is performed, generally designated by 69. The repetition process involves, allowing longer extension increment, adjusting total floats, formulating a model for the new scheme, and searching for a solution. Thus, searching for a solution at a specified credit limit is an iterative process, each iteration uses larger extension increment than the previous iteration. If many iterations are performed with no solution that indicates an insufficient credit limit.

As described above there are seven unique capabilities in the invention:

1. Produces realistic schedules as far as finance availability is concerned and thus increases the utility of schedules.
2. Builds on the widely-spread CPM and PERT techniques and thus are readily plausible for practitioners.
3. Achieves financial feasibility besides the demanded goal of time minimization.
4. Employs the optimization technique of integer programming to give optimum solutions.
5. Defines a scheme for the extension of schedules to achieve minimum extension of the schedule total duration.
6. Defines a scheme that transforms the process of seeking an extended schedule that fulfils finance constraints from a searching in a boundless region to a search in a well-defined and definite region.
7. Provides a sensitivity analysis technique through the gradual increase in extension increment.

These are not dependent on each other. The integer programming, for instance, could be used with scheduling techniques other than CPM or PERT, without defining a scheme, or without incremental increase of the searching scope, perhaps not so efficiently. In this embodiment, the seven major features of the invention have been united to form an efficient and compact combination as described herein.

The following sections illustrate the manner in which the invention has been implemented in the preferred embodiment. The implementation of the method involves basically the model formulation. Thus, the model formulation is explained with an illustrative example.

The model is formulated by considering the previously introduced variables and the general activity k. The proposed model employed CPM/PERT constraints of activity sequence and activity shifting as developed by Easa, S. M., Resource Leveling in Construction By Optimization, Journal of Construction Engineering and Management, Vol. 115, No. 2, pp. 302-316., (1989). Moreover, the present invention adds an additional constraint to cover the financial aspect.

Objective Function

The decision variable x denotes the shift in an activity. As mentioned above, the objective of the model is to minimize the total extension of the schedule through minimizing the shifting in the last critical activity n. Thus, the objective function can be formulated as:

$$\text{Minimize } z = x_n \quad \text{Eqn (11)}$$

Activity shifting constraints

This insures that the shifting in activities $x_k$; $k=1, 2, \ldots, n$ where n is the total number of activities, is an integer within the adjusted total float. The amount of shifting of activities $x_k$ can be represented by:

$$x_k = \sum_{j=1}^{J_k} jS_{kj} \quad k = 1, 2, \ldots, n \quad \text{Eqn (12)}$$

$$\sum_{j=1}^{J_k} S_{kj} \leq 1 \quad k = 1, 2, \ldots, n \quad \text{Eqn (13)}$$

where $J_k$=adjusted total float of activity k. $S_{kj} \in \{0, 1\}$ are binary variables. These equations ensure that $x_k$ takes values of 0, 1, 2, ..., $J_k$ and only one of these values is considered at a time. In other words, Eqn. 13 means that only one $S_{kj}$ equals 1 and the others equal zero (in this case $x_k=j_k$) or all $S_{kj}$ equal zero (in this case $x_k=0$). Thus, Eqns. 12 and 13 allow $x_k$ to take all possible values from 0 up to $J_k$.

Activity Sequence Constraints

A constraint between activity k and each of the activities $q \in Q_k$ is needed. This is because the early finish time of each activity q must be equal to or more than the earliest finish of activity k plus the duration of activity q. This can be represented mathematically by:

$$EF_q \geq (EF_k + D_q) \, k=1, 2, \ldots, n \text{ for all } q \in Q_k \quad \text{Eqn (14)}$$

Specified Credit Limit Constraints

The negative cash flow at any period t including accumulated interest charges $F_t$ should not exceed the specified credit limit W of the overdraft. This constraint can be formulated as follows:

$$F_t \leq W \quad \text{Eqn (15)}$$

$F_t$, as in Equation 7, for each period of the project can be formulated in terms of disbursement rate $y_{pi}$ using equations 1 till 8 respectively. The disbursement rate $y_{pi}$ can be formulated similar to the formulation of resource rate used by Easa, S. M., Resource Leveling in Construction By Optimization, Journal of Construction Engineering and Management, Vol. 115, No. 2, pp. 302-316., (1989) as in equations 16. Note that Equations 16 uses the subscript k to illustrate activity k, but it should be used for all activities p which are performed in time unit i.

For activity k of disbursement rate $R_k$, the disbursement rate in time unit i can be calculated as follows:

$$y_{ki} = \left(1 - \sum_{j=1}^{J_k} S_{kj}\right) R_k; \; ES_k; \; \leq i < EF_k \quad \text{Eqn (16a)}$$

$$y_{ki} = S_{kj} \cdot R_k; \; ES_k + j \leq i < EF_k + j, j=1, 2, \ldots, J_k \quad \text{Eqn (16b)}$$

$$y_{ki} = 0; \text{ otherwise} \quad \text{Eqn (16c)}$$

As noted from Eqn. 16a, when $\Sigma S_{kj}=0$ (i.e., $x_k=0$ from Eq. 12) the disbursement rate $R_k$ will be considered for each time unit within $ES_k$ and $EF_k$. As also noted from Eq. 16b, when any $S_{kj}=1$ (i.e., $x_k=j_k$ from Eqns. 12 and 13) the disbursement rate $R_k$ will be considered for each time unit in which activity k is performed in its shifted position.

Finally, the objective function and constraints are formulated in terms of $S_{kj}$ variables. Thus, the model constraints and objective function represents an integer optimization model that can be solved directly by a number of the existing computer software systems. The non zero variable indicates the shift, for instance, if $Sk_{k3}=1$ that indicates a shift value in activity k of 3 time units.

EXAMPLE

An illustrative CPM schedule example is used to demonstrate the method presented in this invention. FIG. 7A shows the original schedule consisting of five activities, disbursement rate ($/day) is indicated above each activity. A scheme is shown in FIG. 7B with 5-day extension increment. The extended duration is 16 working days which represents three full periods each comprises five working days and a fourth period of one day. The objective function and constraints are presented below:

Objective Function:

Using Equation 12 to formulate the shift in the last activity E of the schedule and substituting in Equation 11, the objective function of the example schedule becomes:

$$\text{Minimize } Z = S_{E1} + 2S_{E2} + 3S_{E3} + 4S_{E4} + 5S_{E5} \quad \text{Eqn (17)}$$

Activity Sequence Constraints:

Referring to FIG. 7A, equation 14 can be interpreted in terms of shifts as follows for activities A, B, C, D, and E.

Shift of activity A should not be greater than shift of activity E by three days which is the total float of A.

Shift of activity B should not be greater than shift of activity C.

Shift of activity B should not be greater than shift of activity D.

Shift of activity C should not be greater than shift of activity E.

Shift of activity D should not be greater than shift of activity E by three days which is the total float of D. This is to insure that the schedule duration remains determined by end of activity E.

Using equation 12 to formulate shifts of activities A, B, C, D, and E, the above five constraints can respectively be formulated as follows:

$$S_{A1} + 2S_{A2} + 3S_{A3} + 4S_{A4} + 5S_{A5} + 6S_{A6} + 7S_{A7} + 8S_{A8} - S_{E1} - 2S_{E2} - 3S_{E3} - 4S_{E4} - 5S_{E5} \leq 3 \quad \text{Eqn (18)}$$

$$S_{B1} + 2S_{B3} + 3S_{B3} + 4S_{B4} + 5S_{B5} - S_{C1} - 2S_{C2} - 3S_{C3} - 4S_{C4} - 5S_{C5} \leq 0 \quad \text{Eqn (19)}$$

$$S_{B1} + 2S_{B3} + 3S_{B3} + 4S_{B4} + 5S_{B5} - S_{D1} - 2S_{D2} - 3S_{D3} - 4S_{D4} - 5S_{D5} - 6S_{C6} - 7S_{D7} - 8S_{D8} \leq 0 \quad \text{Eqn (20)}$$

-continued $$S_{C1} + 2S_{C2} + 3S_{C3} + 4S_{C4} + 5S_{C5} - S_{E1} - 2S_{E2} - 3S_{E3} - 4S_{E4} - 5S_{E5} \leq 0 \quad \text{Eqn (21)}$$

$$S_{D1} + 2S_{D2} + 3S_{D3} + 4S_{D4} + 5S_{D5} + 6S_{D6} + 7S_{D7} + 8S_{D8} - S_{E1} - 2S_{E2} - 3S_{E3} - 4S_{E4} - 5S_{E5} \leq 3 \quad \text{Eqn (22)}$$

Activity Shifting Constraints:

Referring to equation 13, activity shifting constraints can be formulated as follows for activities A, B, C, D, and E.

$$S_{A1}+S_{A2}+S_{A3}+S_{A4}+S_{A5}+S_{A6}+S_{A7}+S_{A8} \leq 1 \quad \text{Eqn (23)}$$

$$S_{B1}+S_{B3}+S_{B3}+S_{B4}+S_{B5} \leq 1 \quad \text{Eqn (24)}$$

$$S_{C1}+S_{C2}+S_{C3}+S_{C4}+S_{C5} \leq 1 \quad \text{Eqn (25)}$$

$$S_{D1}+S_{D2}+S_{D3}+S_{D4}+S_{D5}+S_{D6}+S_{D7}+S_{D8} \leq 1 \quad \text{Eqn (26)}$$

$$S_{E1}+S_{E2}+S_{E3}+S_{E4}+S_{E5} \leq 1 \quad \text{Eqn (27)}$$

Specified Credit Limit Constraints:

Referring to FIG. 7B, the project daily disbursement $y_i$ in equation 1 can be formulated for 16 days using equations 16a, 16b, and 16c as follows:

$$y_1 = 5000 - 2000S_{A1} - 2000S_{A2} - 2000S_{A3} - 2000S_{A4} - 2000S_{A5} - 2000S_{A6} - 2000S_{A7} - 2000S_{A8} - 3000S_{B1} - 3000S_{B2} - 3000S_{B3} - 3000S_{B4} - 3000S_{B5} \quad \text{Eqn (28)}$$

$$y_2 = 5000 - 2000S_{A2} - 2000S_{A3} - 2000S_{A4} - 2000S_{A5} - 2000S_{A6} - 2000S_{A7} - 2000S_{A8} - 3000S_{B2} - 3000S_{B3} - 3000S_{B4} - 3000S_{B5} \quad \text{Eqn (29)}$$

$$y_3 = 5000 - 2000S_{A3} - 2000S_{A4} - 2000S_{A5} - 2000S_{A6} - 2000S_{A7} - 2000S_{A8} - 3000S_{B3} - 3000S_{B4} - 3000S_{B5} \quad \text{Eqn (30)}$$

$$y_4 = 8000 - 2000S_{A4} - 2000S_{A5} - 2000S_{A6} - 2000S_{A7} - 2000S_{A8} + 3000S_{B1} + 3000S_{B2} + 3000S_{B3} - 4000S_{C1} - 4000S_{C2} - 4000S_{C3} - 4000S_{C4} - 4000S_{C5} - 2000S_{D1} - 2000S_{D2} - 2000S_{D3} - 2000S_{D4} - 2000S_{D5} - 2000S_{D6} - 2000S_{D7} - 2000S_{D8} \quad \text{Eqn (31)}$$

$$y_5 = 8000 - 2000S_{A5} - 2000S_{A6} - 2000S_{A7} - 2000S_{A8} + 3000S_{B2} + 3000S_{B3} + 3000S_{B4} - 4000S_{C2} - 4000S_{C3} - 4000S_{C4} - 4000S_{C5} - 2000S_{D2} - 2000S_{D3} - 2000S_{D4} - 2000S_{D5} - 2000S_{D6} - 2000S_{D7} - 2000S_{D8} \quad \text{Eqn (32)}$$

$$y_6 = 8000 - 2000S_{A6} - 2000S_{A7} - 2000S_{A8} + 3000S_{B3} + 3000S_{B4} + 3000S_{B5} - 4000S_{C3} - 4000S_{C4} - 4000S_{C5} - 2000S_{D3} - 2000S_{D4} - 2000S_{D5} - 2000S_{D6} - 2000S_{D7} - 2000S_{D8} \quad \text{Eqn (33)}$$

$$y_7 = 6000 + 2000S_{A1} + 2000S_{A2} + 2000S_{A3} + 2000S_{A4} + 2000S_{A5} + 2000S_{A6} + 3000S_{B4} + 3000S_{B5} - 4000S_{C4} - 4000S_{C5} - 2000S_{D4} - 2000S_{D5} - 2000S_{D6} - 2000S_{D7} - 2000S_{D8} \quad \text{Eqn (34)}$$

$$y_8 = 6000 + 2000S_{A2} + 2000S_{A3} + 2000S_{A4} + 2000S_{A5} + 2000S_{A6} + 2000S_{A7} + 3000S_{B5} - 4000S_{C5} - 2000S_{D5} - 2000S_{D6} - 2000S_{D7} - 2000S_{D8} \quad \text{Eqn (35)}$$

$$y_9 = 4000 + 2000S_{A3} + 2000S_{A4} + 2000S_{A5} + 2000S_{A6} + 2000S_{A7} + 2000S_{A8} + 2000S_{D1} + 2000S_{D2} + 2000S_{D3} + 2000S_{D4} + 2000S_{D5} \quad \text{Eqn (36)}$$

$$y_{10} = 3000 + 2000S_{A4} + 2000S_{A5} + 2000S_{A6} + 2000S_{A7} + 2000S_{A8} + 4000S_{C1} + 4000S_{C2} + 4000S_{C3} + 4000S_{C4} + 4000S_{C5} + 2000S_{D2} + 2000S_{D3} + 2000S_{D4} + 2000S_{D5} + 2000S_{D6} - 3000S_{E1} - 3000S_{E2} - 3000S_{E3} - 3000S_{E4} - 3000S_{E5} \quad \text{Eqn (37)}$$

$$y_{11} = 3000 + 2000S_{A5} + 2000S_{A6} + 2000S_{A7} + 2000S_{A8} + 4000S_{C2} + 4000S_{C3} + 4000S_{C4} + 4000S_{C5} + 2000S_{D3} + 2000S_{D4} + 2000S_{D5} + 2000S_{D6} + 2000S_{D7} - 3000S_{E2} - 3000S_{E3} - 3000S_{E4} - 3000S_{E5} \quad \text{Eqn (38)}$$

$$y_{12} = 2000S_{A6} + 2000S_{A7} + 2000S_{A8} + 4000S_{C3} + 4000S_{C4} + 4000S_{C5} + 2000S_{D4} + 2000S_{D5} + 2000S_{D6} + 2000S_{D7} + 2000S_{D8} + 3000S_{E1} + 3000S_{E2} \quad \text{Eqn (39)}$$

$$y_{13} = 2000S_{A7} + 2000S_{A8} + 4000S_{C4} + 4000S_{C5} + 2000S_{D5} + 2000S_{D6} + 2000S_{D7} + 2000S_{D8} + 3000S_{E2} + 3000S_{E3} \quad \text{Eqn (40)}$$

$$y_{14} = 2000\,S_{A8} + 4000\,S_{C5} + 2000\,S_{D6} + 2000\,S_{D7} + 2000\,S_{D8} + 3000\,S_{E3} + 3000\,S_{E4} \quad \text{Eqn (41)}$$

$$y_{15} = 2000\,S_{D7} + 2000\,S_{D8} + 3000\,S_{E4} + 3000\,S_{E5} \quad \text{Eqn (42)}$$

$$y_{16} = 2000\,S_{D8} + 3000\,S_{E5} \quad \text{Eqn (43)}$$

Then, equation 2 can be used to formulate Et for the four periods of the schedule as follows:

$$E_1 = y_1 + y_2 + y_3 + y_4 + y_5 \qquad \text{Eqn (44)}$$

$$E_2 = y_6 + y_7 + y_8 + y_9 + y_{10} \qquad \text{Eqn (45)}$$

$$E_3 = y_{11} + y_{12} + y_{13} + y_{14} + y_{15} \qquad \text{Eqn (46)}$$

$$E_4 = y_{16} \qquad \text{Eqn (47)}$$

Note that four equations 44 till 47 are in terms of $S_{kj}$. Given the value of the multiplier K, the corresponding formulas of $P_t$ can be performed using equation 3. Then, formulas for $U_t$, $V_t$, $I_t$, and $F_t$ can be established in terms of $S_{kj}$ using equations 4, 5, 8, and 7 respectively. Accordingly, five constraints can be established to express the conditions that $F_1$ till $F_5$ must undervalue the specified credit limit. These constraints are not presented here for being too lengthy. It is to be noted that credit limit could be constant throughout periods or varies from period to period.

Then, the objective function in equation 17, activity sequence constraints in equations 18 till 22, activity shifting constraints in equations 23 till 27, and credit limit constraints represent the integer programming model that can be solved for $S_{kj}$ values using available software.

Summary, Ramifications, and Scope

Thus the reader will see that the finance-based scheduling method of the invention provides a reliable method that can be used to produce realistic schedules as far as finance availability is concerned with the following advantages:

1. Increases the usefulness of schedules by rendering them feasible as far as finance availability is concerned.
2. Builds trust on schedules from wider sector of practitioners and thus increases the willingness to use CPM as a project management tool.
3. Offers twofold benefits of minimizing of total project duration and fulfilling finance availability constraints.
4. Offers optimum solutions through employing integer programming optimization technique.
5. Provides an invaluable tool for negotiating and establishing good bank overdrafts.
6. Introduces CPM technique to the attention of decision makers as a business-management tool as well as a production-management tool.
7. Brings businessmen and production men to common grounds of understanding so that their goals are unified rather than conflicting.

Although the description above contains many specificities, these should not be construed as limiting the scope of the invention but as merely providing illustrations of some of the presently preferred embodiments of this invention. For example, the optimization technique can be replaced by a suboptimal, heuristic technique or any algorithm that fulfills the constraint of specified finance; The method can handle credit limits that vary in values along schedule periods, thus can easily handle additional short-term loans; the method can achieve other benefits rather than time minimization; the concept of finance-based scheduling can be applied to the already existing scheduling methods or any new techniques that will be developed in the future based on different concepts of scheduling, the concept of finance-based scheduling can be used for projects rather than construction projects which have similar features as far as financing is concerned, etc.

Thus the scope of the invention should be determined by the appended claims and their legal equivalents, rather than by the embodiment illustrated.

I claim:

1. A method of constructing a timetable for finance-based scheduling, comprising the steps of:
   providing computer processing means and computer readable media;
   inputting a data set including a list of projects to be sorted by said computer processing means, and storing said data set on said computer readable media;
   inputting financial data including data representing available funds, and storing said financial data on said computer readable media;
   inputting duration data associated with each said project of the data set, said duration data including time of completion for each said project, and storing said duration data on said computer readable media;
   inputting sequence data associated with each said project of the data set, and storing said sequence data on said computer readable media;
   inputting financial disbursement data associated with each said project of the data set, and storing said financial disbursement data on said computer readable media;
   inputting cost data associated with each said project of the data set, and storing said cost data on said computer readable media;
   inputting at least one mode of payment associated with each said project of the data set, and storing said at least one mode of payment on said computer readable media;
   inputting time-based data associated with each said project of the data set, said time-based data including time of payment for each respective project and time of disbursement payment for each respective project, and storing said time-based data on said computer readable media;
   calculating start and end dates for each said project based upon said sequence data, said financial data, said duration data, said financial disbursement data, said cost data, said at least one mode of payment, and said time-based data, wherein the financial data is balanced with the financial disbursement data; and
   displaying a timetable to a user, said timetable being arranged by the calculated start and end dates for each project
      wherein said time-based data includes time of withdrawal of disbursement funds from a bank overdraft of a predetermined credit limit;
      wherein said time-based data further includes time of payment of funds to said bank overdraft; and
      wherein the calculated start and end dates are adjusted based on the available funds and the time-based data.

2. The method of constructing a timetable for finance-based scheduling as recited in claim 1, wherein said financial disbursement data is selected from the group consisting of: material costs, labor costs, equipment costs, subcontractor costs, mobilization costs, overhead costs, bond fees, insurance fees, taxes, financing fees, late-completion penalties and combinations thereof.

3. The method of constructing a timetable for finance-based scheduling as recited in claim 1, wherein said data representing available funds is continually updated based upon incoming payments.

4. The method of constructing a timetable for finance-based scheduling as recited in claim 3, wherein said incoming payments are selected from the group consisting of: advance payments, material-purchasing payments, equipment-purchasing payments, progress payments, final payments, early-completion bonuses and combinations thereof.

5. The method of constructing a timetable for finance-based scheduling as recited in claim 1, wherein said at least one mode of payment is selected from the group consisting of: unit prices, cost-plus-fees, lump sums and combinations thereof.

6. The method of constructing a timetable for finance-based scheduling as recited in claim 1, wherein said start and end dates are calculated using an algorithm selected from the group consisting of: optimization algorithms, near-optimization algorithms and heuristic algorithms.

7. The method of constructing a timetable for finance-based scheduling as recited in claim 6, wherein said algorithm includes a plurality of objectives, the number of said objectives equaling the number of said projects in said data set.

8. The method of constructing a timetable for finance-based scheduling as recited in claim 7, wherein said objectives are each cost minimization values.

9. The method of constructing a timetable for finance-based scheduling as recited in claim 1, wherein a predetermined extension increment is appended to a total float value associated with each said project to form an adjusted float value associated with each said project.

* * * * *